United States Patent [19]
Goto

[11] Patent Number: 6,052,534
[45] Date of Patent: Apr. 18, 2000

[54] CLOSE-UP PHOTOGRAPHING APPARATUS

[75] Inventor: Tadashi Goto, Yokohama, Japan

[73] Assignee: Goko International Corporation, Japan

[21] Appl. No.: 09/138,812

[22] Filed: Aug. 21, 1998

[30] Foreign Application Priority Data

Aug. 22, 1997 [JP] Japan .................................. 9-226176

[51] Int. Cl.[7] .................................................. G03B 17/00
[52] U.S. Cl. .............................................. 396/71; 396/544
[58] Field of Search .............................. 396/71, 72, 419, 396/544

[56] References Cited

U.S. PATENT DOCUMENTS 2,018,015  10/1935  Fahrney ................................ 396/71 X
5,294,948   3/1994  Merkt et al. ............................. 396/544

Primary Examiner—Howard B. Blankenship
Attorney, Agent, or Firm—Skjerven, Morrill, MacPherson, Franklin & Friel LLP; Alan H. MacPherson

[57] ABSTRACT

The close-up photographing apparatus includes a range determining frame having a guide plate at a front end thereof. A frontal opening defining a photographic object area is formed in the guide plate. The range determining frame allows a photographic object placed in the frontal opening to be at an optimum distance for a best photographing result. The guide plate allows the apparatus to be placed flat on a table or the like supporting a photographic object. The apparatus further includes a strobe light for lighting the object in the frontal opening, and an aperture member defining a small aperture opening which achieves a large depth of field and a proper photographic exposure in cooperation with the strobe light. Thus, the apparatus incorporates all the necessary conditions (distance to the object, lens position, aperture opening, shutter speed and lighting intensity) for close-up photography at a high magnification factor so that a clear picture of a high magnification factor can be taken easily even for an inexperience person.

28 Claims, 10 Drawing Sheets

CLOSE-UP PHOTOGRAPHING APPARATUS

TECHNICAL FIELD

The present invention relates to a close-up photographing apparatus which allows photographic pictures of high magnification factors to be taken both easily and economically, and a camera incorporated with such an apparatus.

BACKGROUND OF THE INVENTION

Conventional cameras are generally unsuitable for close-up photographing. Even cameras acclaimed as being cameras for close up photographing cannot be brought to the photographic object any closer than about 50 cm. This may be attributed to various reasons. One of the reasons will be found in the difficulty in setting various photographic conditions such as lighting proper for close-up photographing. Also, the depth of field gets so small as the camera gets closer to the object that it is difficult to obtain a picture having a depth.

Therefore, to the knowledge of the inventor, there has not been any serious attempt to adapt a compact camera to close-up photographing by allowing the lens to be moved by a significant distance. The inventor of this application proposed a camera which is suited for close-up photographing in a real sense in a copending patent application Ser. No. 08/967,462. The contents of this copending application are hereby incorporated in this application by reference.

The introduction of this camera which allows a close-up picture to be taken very easily has resulted in a realization that there is a strong demand for photographing objects at high magnification factors, and, hence, cameras which are suited for taking pictures of objects at extremely close ranges even more easily and clearly.

BRIEF SUMMARY OF THE INVENTION

In view of such problems of the prior art and the realization of the inventor, a primary object of the present invention is to provide a close-up photographing apparatus which allows a close-up picture to be taken both easily and reliably.

A second object of the present invention is to provide a close-up photographing apparatus which allows a close-up picture to be taken at a high magnification factor without requiring any specialized accessory equipment.

A third object of the present invention is to provide a close-up photographing apparatus which allows a close-up picture to be taken at a high magnification factor even for a photographer without any special training or knowledge.

According to the present invention, these and other objects are accomplished by providing a close-up photographing apparatus, comprising: a range determining frame having a base end adapted to be attached to a camera body, a middle portion and a free end; a frontal opening provided in the free end to define a photographic object area; a strobe light provided in the middle portion for lighting the photographic object area defined by the frontal opening; and a lens assembly including a lens and an aperture member incorporated in the base end, the aperture member defining a small aperture opening adapted for an intensity of light radiated from the strobe light onto the photographic object area.

Thus, all the settings required for taking close-up photographic pictures of high magnification factors are incorporated in the apparatus of the present invention, and a clear picture of a high magnification factor can be taken without fail both easily and economically. In particular, the range determining frame may be used for supporting the apparatus over the photographic object so that the entire assembly can be held completely stationary without any effort, and a satisfactory photographing can be ensured at all times.

The apparatus of the present invention may be integrally incorporated with a camera body to form a self-sufficient camera specializing in taking close-up shots at high magnification factors or may be adapted to be detachably attached to a camera body so that a single range determining frame may be used in combination with different camera bodies and/or a single camera body may be used in combination with different range determining frames. For instance, a camera body for normal roll film and a camera body adapted for instant film cartridges may be interchangeably used in combination with a common range determining frame.

The apparatus of the present invention may be used by holding it with hands or supporting it on a tripod, but it can be used more conveniently by placing a photographic object on a table and placing the free end of the apparatus flat on the table while placing the photographic object in the frontal opening or the photographic object area of the apparatus. The free end of the range determining frame may comprise at least one side cut-out to allow the photographic object area to be viewed from sideways when the free end is placed flat on a photographic object. The circuit and the components for powering the strobe light may be conveniently stored in an inner chamber defined in the middle portion of the range determining frame. The free end of the range determining frame may be made detachable so as to prevent the free end from interfering with the object right in front of the apparatus when it is held by hand or supported on a tripod. Also, an adapter for illuminating the object from the rear may be attached to the free end. Such an adapter allows an object to be photographed by using the light transmitted through the object.

According to an embodiment of the present invention which provides a variable magnification factor, the apparatus further comprises an adjusting member for axially moving the free end of the range determining frame, and a synchronizing mechanism for moving the lens in synchronization with a movement of the free end so as to form a clear image on a film surface at a variable magnification factor.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
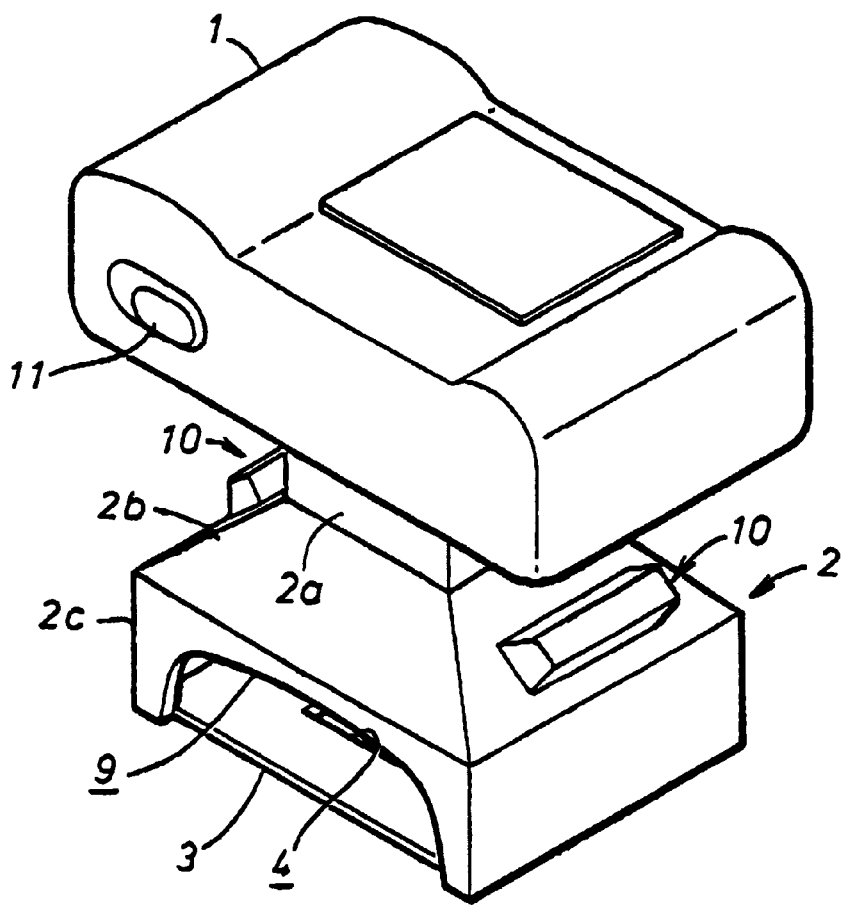
FIG. 1 is a perspective view of a camera embodying the present invention.

Referring to FIG. 1, a camera embodying the present invention comprises a camera body 1 and a range determining frame 2 fixedly attached to the front end of the camera body 1.

The range determining frame 2 has a base end 2a having a relatively small diameter, a middle portion 2b which diverges from the based end, and a free end 2c having a relatively large diameter. In this embodiment, the range determining frame 2 has a generally rectangular cross section over its entire length, and is made of stamp formed sheet metal. The free end 2c has side cut-outs 9, and the front end is closed by a guide plate 3 having a rectangular frontal opening 4 therein, the frontal opening thus defining a photographic object area. The overall length of the range determining frame 2 is determined such that a proper focusing may be made on an object placed in the frontal opening 4.

Figure 2:
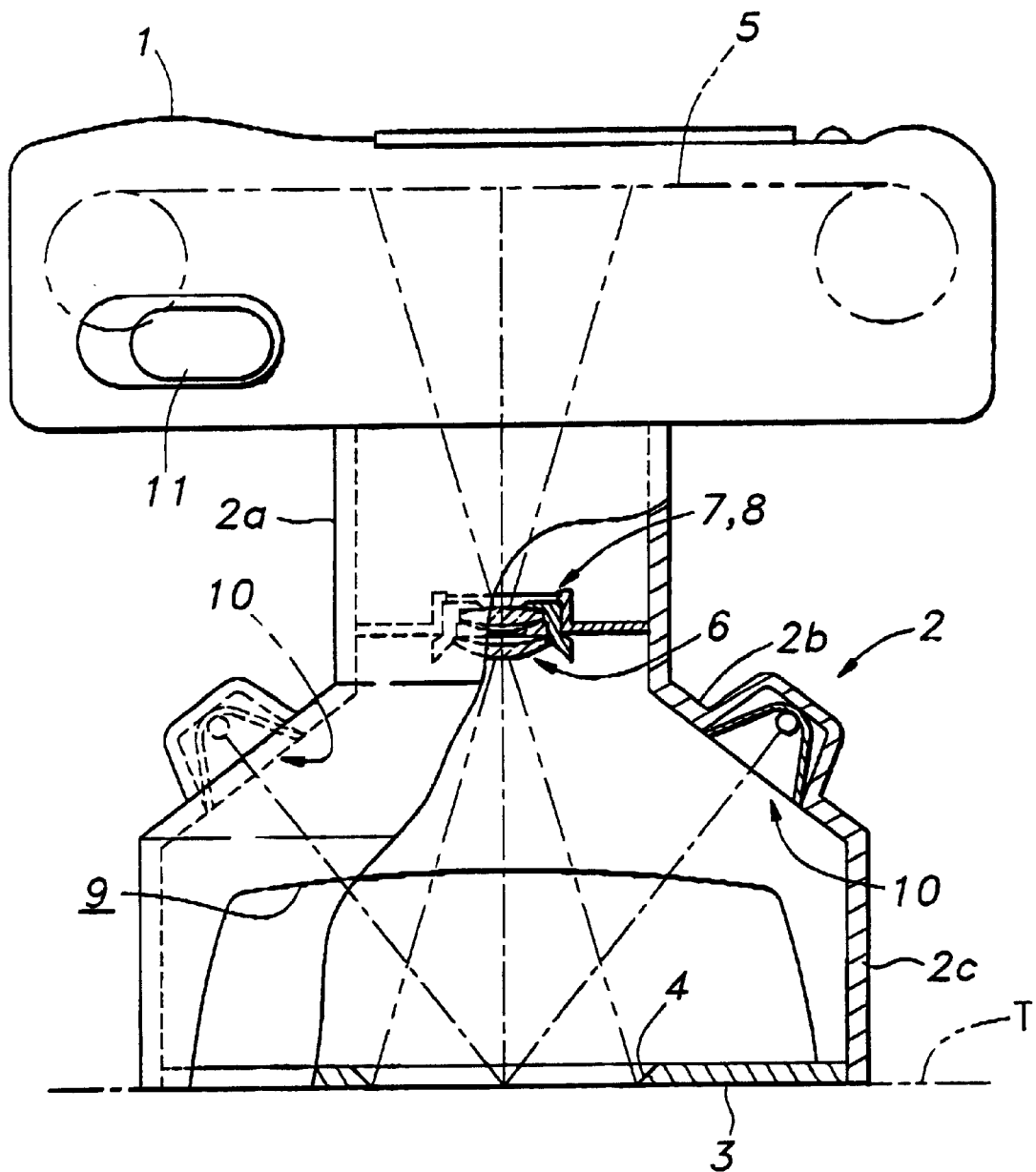
FIG. 2 is a partly broken away plan view of the camera.

Referring to FIG. 2, the camera body 1 is equipped with a film winding mechanism for placing each frame of a photographic film 5 successively on the focal plane. The film winding mechanism may consist of any known type, and is not illustrated in detail. The camera body 1 is not require to be equipped with a view finder because the frontal opening 4 defines the photographic object area.

Inside the base end 2a of the range determining frame 2 is disposed a lens 6 for forming a photographic image of a photographic object onto the surface of the film 5. In this embodiment, the lens 6 is placed in such a position as to form the image of the photographic object on the film surface approximately at an identical size or at a magnification factor of one. An aperture 7 and a shutter 8 are provided in the base end 2a of the range determining frame 2 in association with this lens 6.

The outwardly expanding middle portion 2b is provided with a pair of strobe bulbs 10 on diagonally opposing side walls thereof so as to direct the light emitted from the strobe bulbs 10 onto the center of the frontal opening 4 of the guide plate 3. The strobe bulbs 10 and the reflectors therefor are placed in corresponding recesses in the side walls of the middle portion 2b so as to prevent the light from the strobe bulbs 10 from directly reaching the lens 6.

The side cut-outs 9 are provided in the free end 2c of the range determining frame 2 for allowing the object in the frontal opening 4 to be viewed from sideways. The size and location of the cut-outs 9 may be freely selected so as to allow the photographic object to be viewed as desired. Such cut-outs will let the light stray out of the range determining frame 2a, but, because the intensity of the light is normally more than adequate, any ill effects due to the provision of such cut-outs 9 are highly unlikely. If desired, the entire range determining frame 2 may be made of wire, strips or the likes, and may consist of more skeletal structures, as long as the provision is made such that the light from the strobe bulbs 10 is prevented from directly reaching the lens 6.

The guide plate 3 is detachably attached to the open front end of the range determining frame 2 by a resilient snap fit arrangement not shown in the drawing. The guide plate 3 is provided with a flat front end to allow it to be placed on a flat table surface T with the object placed inside the frontal opening 4.

In this camera, the aperture opening, the shutter speed, and the intensity and duration of the light emitted from the strobe bulbs are fixed, and are determined such that an optimum photographing condition may be achieved for an object placed in the frontal opening 4 of the guide plate 3 simply by pressing on a shutter release button 11 provided on the camera body 1. Typically, the photographic object is placed on a table surface, and the camera is placed over the object with the guide plate 3 flatly resting on the table surface and the photographic object placed in the frontal opening 4. Because the apparatus is thus kept completely stationary, any blurring of the photographic image due to the motion of the apparatus, as often occurs with a hand held camera, can be avoided. Alternatively, the camera may be held by hand or on a tripod to shoot an object placed in the frontal opening 4.

Because the object is placed extremely close to the film surface, if the aperture opening is selected at a normal value, the depth of field will become unacceptably small. Therefore, if the object is three-dimensional or has any depth, a proper focusing will be achieved only in a part of the object while the remaining part is placed out of focus, and a clear photographic picture of the entire object cannot be taken. Also, the dimensional precision of the range determining frame is required to be extremely high. To avoid these problems, according to the present invention, the aperture opening is substantially reduced from those commonly used in conventional cameras, and the resulting need for proper lighting of the object is met by providing the strobe bulbs 10 placed in close proximity to the photographic object.

The criterion for the depth of field is based on the selection of the circle of confusion of 0.05 mm which is widely accepted for cameras for general consumers. In this embodiment, the aperture opening is selected at F44 or less. This selection is based on the strobe guide numbers of commercially available strobe bulbs and the sensitivities of common photographic films which typically range from ISO-100 to ISO-400, and can be varied depending on the particular strobe bulbs and photographic films that are intended to be used. It should be noted that the latitude of the photographic film is also a significant factor in achieving a proper photographic exposure. However, it was found that other commercially available photographic films which have less latitude such as reversal films and instant films or prints can be safely used with the apparatus of the present invention. The shutter speed on the other hand is less significant as long as it is slow enough to synchronize with the strobe flash which typically has a sufficiently short time duration. The shutter speed may be, for instance, $\frac{1}{90}$ seconds or slower.

The magnification factor of the camera can be changed by changing the position of the lens. When the lens is placed at a middle point between the film and the object, a photographic image which is substantially identical in size to the object can be formed on the surface of the film. When APS film is used and printed to a typical size, the image formed on the photographic print will be at a magnification factor of approximately six. In case of a wide print, an even higher magnification factor will be achieved.

As mentioned earlier, the magnification factor can be changed by properly selecting the position of the lens with respect to the film and the object. The illustrated embodiment can be readily adapted to achieve any magnification factor in the range of 0.5 to 4 on the photographic film, and 2.0 , to 23 on the photographic print. If necessary modifications are made to the camera assembly, such as adding condenser lenses for the strobe bulbs or increasing the output capacity of the strobe bulbs, even higher magnification factors can be achieved. By making the guide plate detachable, even when the table or the part surrounding the object has an irregular surface, it is possible to support the camera in a stable fashion. To even further enhance this feature, the front end of the range determining frame may be provided with legs having pointed ends.

Figure 3:
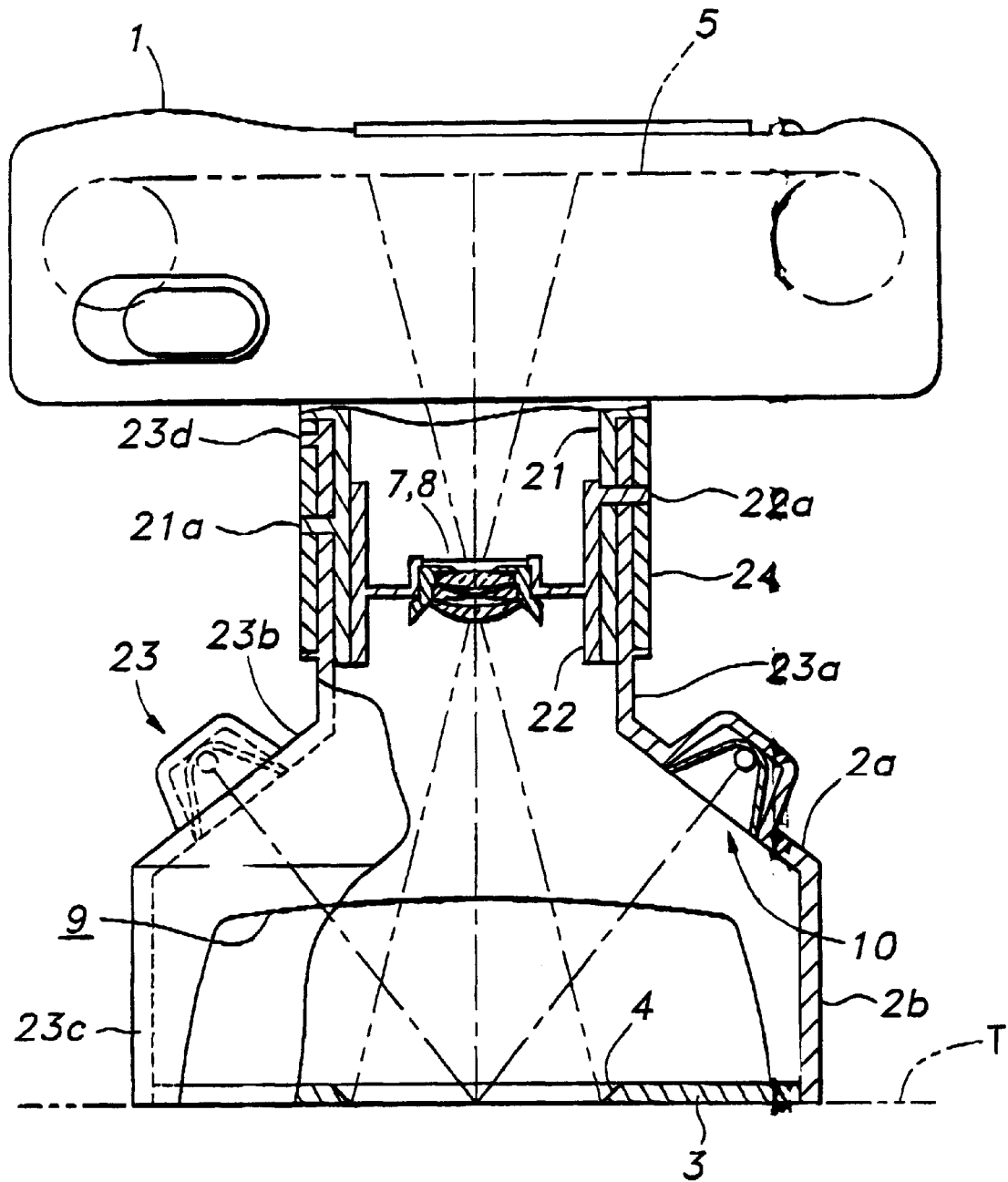
FIG. 3 is a view similar to FIG. 2 showing a second embodiment of the present invention.
Figure 4:
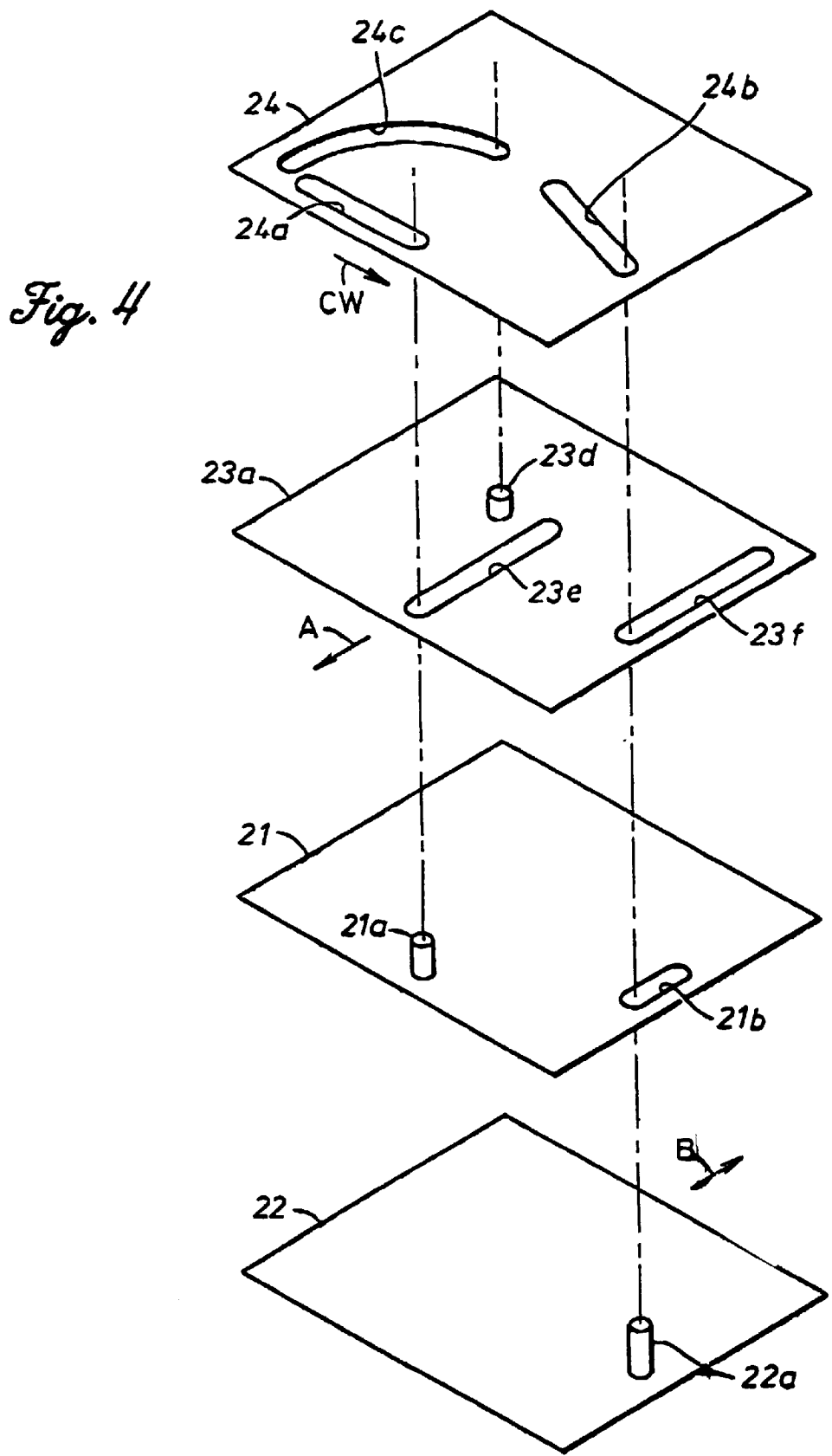
FIG. 4 is an exploded, extended view of the arrangement for varying the magnification factor.
Figure 5:
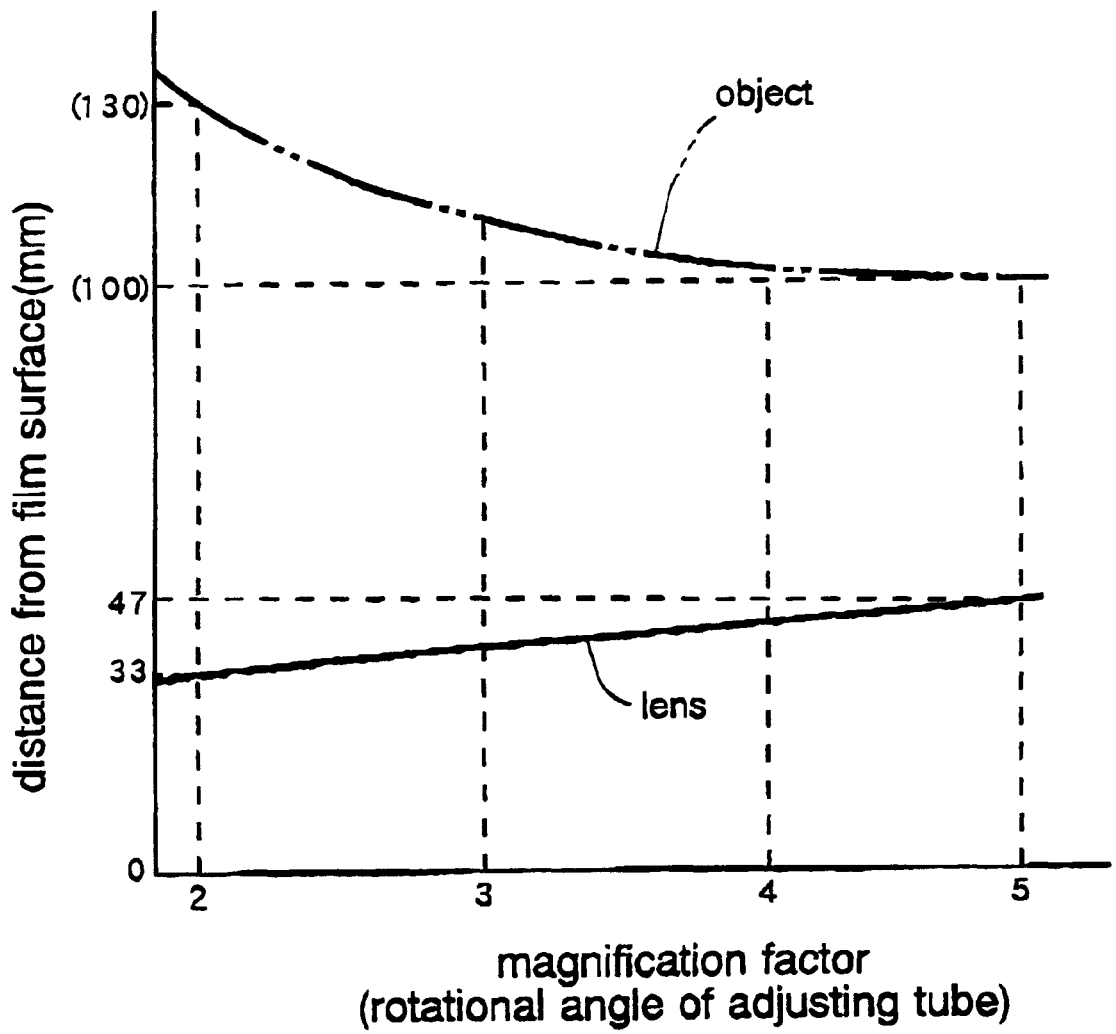
FIG. 5 is a graph for describing the operation of the arrangement for varying the magnification factor.

FIGS. 3 to 5 show a second embodiment of the present invention which provides a variable magnification factor. The parts corresponding to those of the previous embodiment are denoted with like numerals.

The camera body 1 is provided with a fixed tubular projection 21 extending from the front end thereof coaxially with respect to the optical center line. A lens retaining tube 22 is coaxially and slidably received in the fixed tubular projection 21. A base end of the range determining frame 23 is formed as a tubular extension 23a which is slidably and coaxially fitted on the fixed tubular extension 21. The range determining frame 23 is additionally provided with a middle portion 23b and a free end 23c similarly as that of the first embodiment. An adjusting tube 24 is slidably and coaxially fitted on the tubular extension 23a of the range determining frame 23.

These tubes 21, 22, 23a and 24 are adapted to move in a certain relationship by a pin and slot arrangement. This is illustrated in FIG. 4 in which the tubes and the slots formed therein are shown in their extended state.

The adjusting tube 24 is provided with first to third slots 24a, 24b and 24c. The first slot 24a extends in the circumferential direction of the adjusting tube 24. The second slot 24b extends linearly in the extended view or in a spiral path with respect to the adjusting tube 24. The third slot 24c extends along a curved path in the extended view or along a spiral path having a progressively increasing lead with respect to the adjusting tube 24 as the adjusting tube is turned clockwise as indicated by CW in FIG. 4. A guide pin 23d projecting from the tubular extension 23a is received in the third slot 24c.

The tubular extension 23a is additionally provided with an axially extending guide slot 23e which receives a guide pin 21a projecting from the fixed tubular projection 21. This guide pin 21a passes through the guide slot 23e and is also received in the first slot 24a of the adjusting tube 24. Therefore, the tubular extension 23a is moveable only in the axial direction while the adjusting tube 24 is moveable only in the circumferential direction with respect to the fixed tubular projection 21.

A guide pin 22a projecting from the lens retaining tube 22 is received in the second slot 24b so that, as the adjusting tube 24 is turned, the lens retaining tube 22 moves axially with respect to the fixed tubular projection 21. The intervening fixed tubular projection 21 and tubular extension 23a are provided with clearance slots 21b and 23f, respectively, to avoid interference with the movement of the guide pin 22a.

Thus, by turning the adjusting tube 24, it is possible to change the magnification factor from 2 to 5 in terms of the size of the final print. It is based on the assumption that the film consists of APS film, and is enlarged by the factor of about 5.7 when printed. The magnification factor, therefore, will vary when different films are used and/or different print sizes are used.

Figure 6:
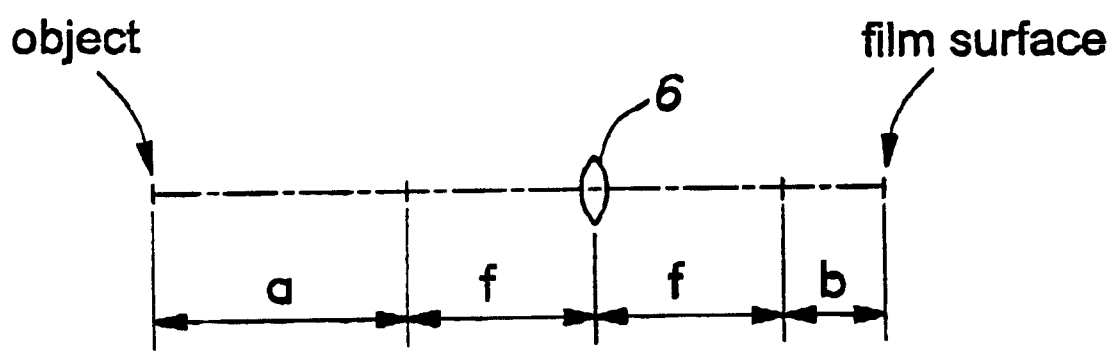
FIG. 6 is a diagram showing various distances associated with the magnification factor of the camera.

The change in the magnification factor is now explained with reference to the graph of FIG. 5 in which the ordinate axis denotes the distances between the film surface and the lens and between the object and the lens, and the abscissa axis denotes the rotational angle of the adjusting tube 4 and the magnification factor. FIG. 6 illustrates the positional relationship between the film 5, the lens 6 and the object; the focal length of the lens is f (f=25 mm), the distance between the object and the corresponding focal point of the lens 6 is a, and the distance between the film 5 and the corresponding focal point of the lens 6 is b.

Thus, the distance between the film 5 and the lens is b+f, and the distance between the film 5 and the object is a+b+2f. Suppose that the minimum magnification factor is selected at 2. Then, the distance between the film 5 and the lens is 33 mm (b+f=33 mm), and the distance between the film 5 and the object is approximately 130 mm (a+b+2f=130 mm). Suppose that the maximum magnification factor is selected at 5. Then, the distance between the film 5 and the lens is 47 mm (b+f=47 mm), and the distance between the film 5 and the object is approximately 100 mm (a+b+2f=100 mm). For the intermediate settings, the lens moves as indicated by the solid line in FIG. 6, and the position of the object changes as indicated by the imaginary line in FIG. 6. Such movement of the lens and positioning of the object can be achieved by the appropriate selection of the shapes of the second slot 24b and the third slot 24c, respectively. In the state illustrated in FIG. 4, the magnification factor is 5. By turning the adjusting tube 24 in counter-clockwise direction, the guide pins 22a and 23d are guided by the corresponding guide slots 24b and 24c, respectively. When the guide pins 22 finally reach the other ends of the guide slots 24b and 24c, respectively, the magnification factor of 2 is achieved. Therefore, by providing suitable scales on the adjusting tube 24, it is possible to achieve any intermediate magnification factor.

Figure 7:
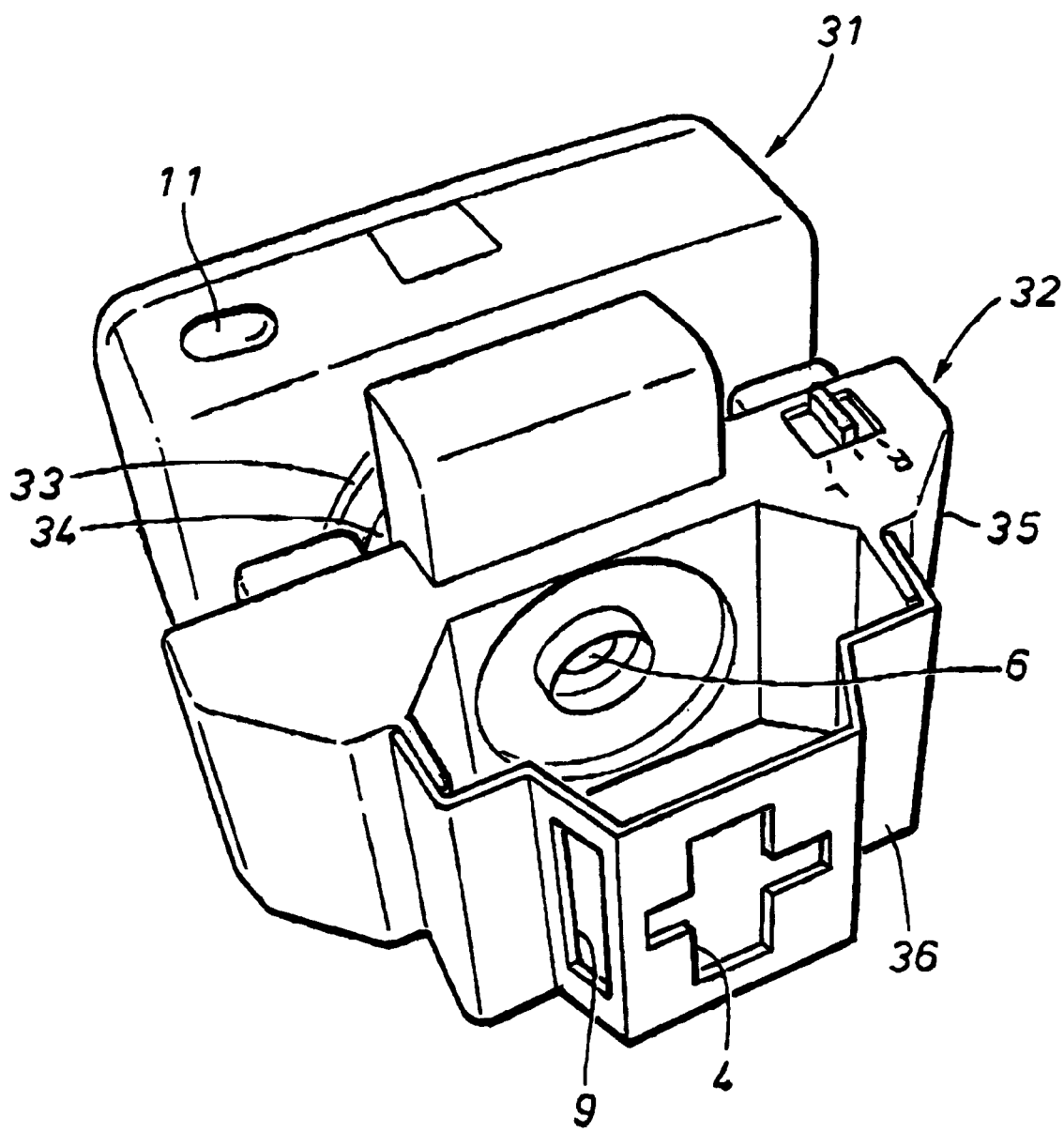
FIG. 7 is a perspective view of a third embodiment of the present invention.
Figure 8:
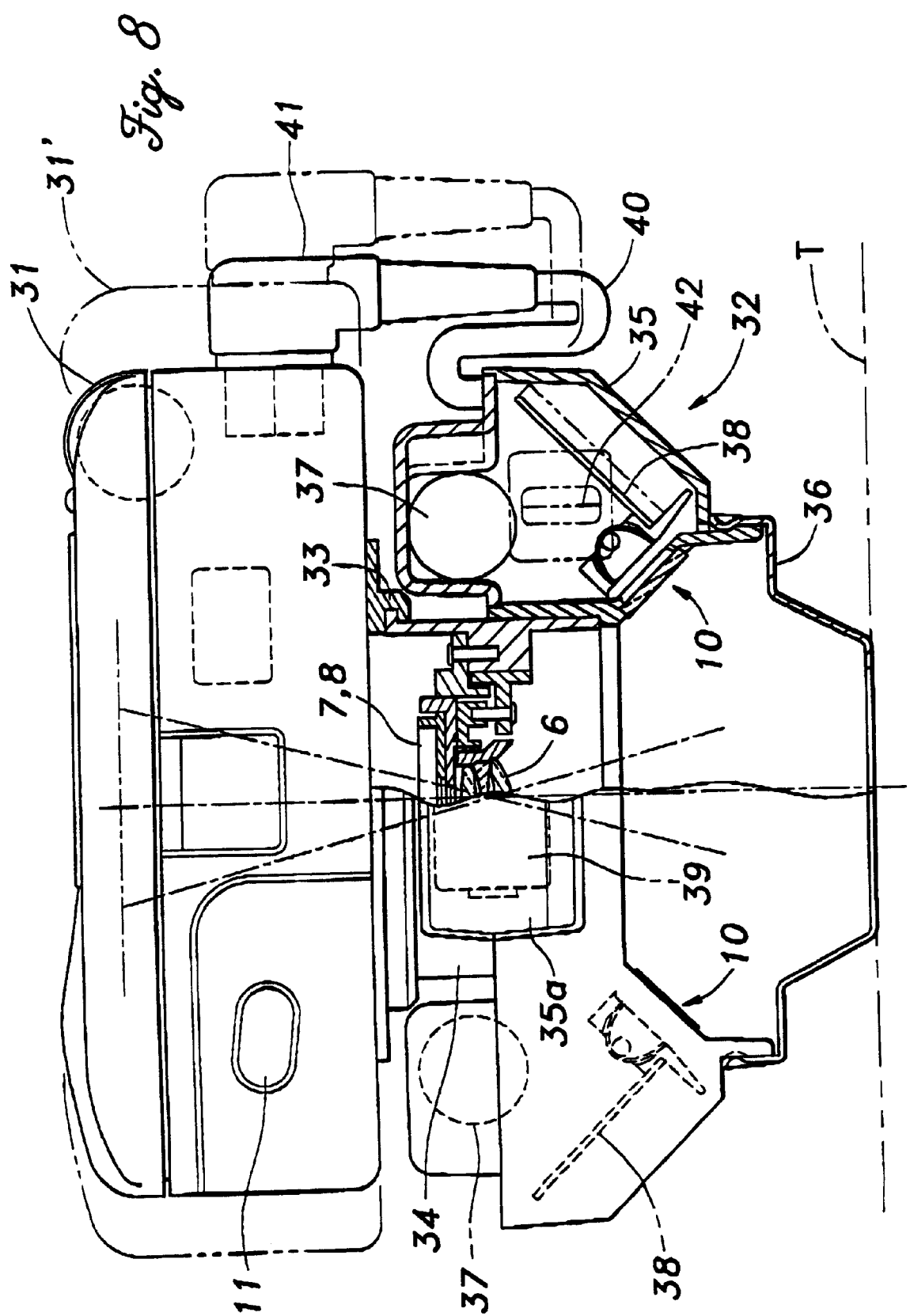
FIG. 8 is a partly broken away plan view of the arrangement illustrated in FIG. 7.
Figure 9:
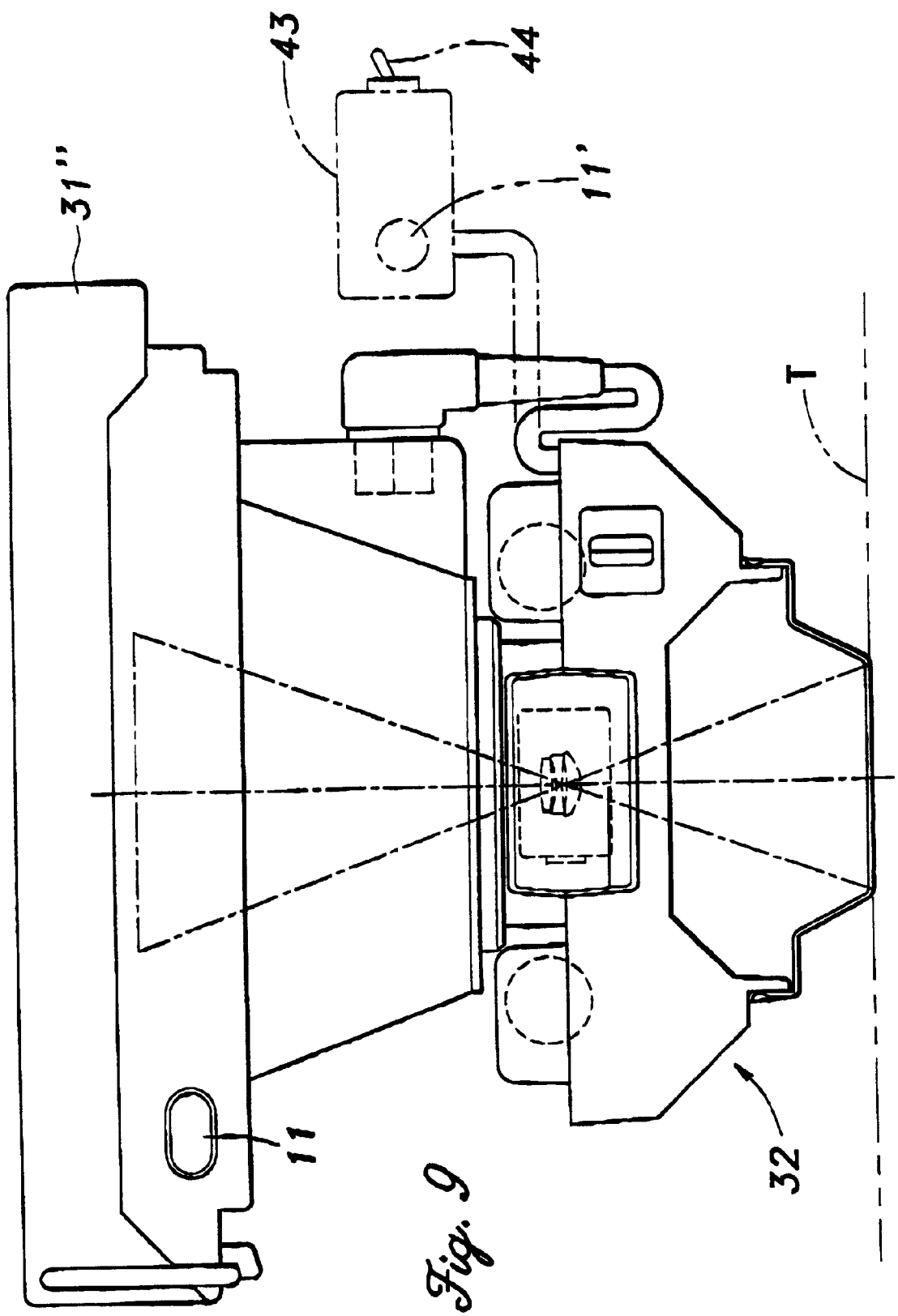
FIG. 9 is a plan view showing the third embodiment fitted with an instant camera pack in place of a normal camera body.

FIGS. 7 to 9 show a third embodiment of the present invention in which the range determining frame is detachable from the camera body. The parts corresponding to those of the previous embodiments are denoted with like numerals.

The range determining frame 32 can be detachably attached to the camera body 31 with a bayonet arrangement 33 which may consist of any known arrangement. The range determining frame 32 comprises a tubular base end 34 which is adapted to be attached to the camera body 31 with the bayonet arrangement 33, a middle portion 35 which defines an inner chamber on either side of the lens 6 for accommodating therein a strobe bulb 10 and a capacitor 37 and a circuit board 38 for the circuit for activating the strobe bulb 10. The middle portion 35 additionally includes a semi-cylindrical extension 35a in an upper end thereof for accommodating a battery 39 required for powering the strobe bulbs 10. The front end of the range determining frame 32 consists of a guide plate 36 which, in this case, has a tapered forward end, and can be detachably snap fitted on the front end of the middle portion 35. The guide plate 36 is provided with a cross shaped frontal opening 4, and a pair of side cut-outs 9.

The middle portion 35 is also provided with a selector switch 42 which allows selecting either one of the strobe bulbs 10 to be activated or both of them to be activated. When the object has a certain depth, activating only one of the strobe bulbs 10 could produce a better photographic image because activating both the strobe bulbs 10 tends to reduce the depth in the produced photographic image.

An aperture 7 and a shutter 8 are provided in association with the lens 6. A cable 40 extending from the middle portion 35 of the range determining flame 32 is connected to the camera body 31 via a connector 41. This cable 40 provides an electric connection that is required to synchronize the flashing of the strobe bulbs 10 and the operation of the shutter 8 with the pressing of the release button 11.

In this case, the camera body 31 and the range determining frame 32 can be separated as desired by using the bayonet arrangement 34 and the connector 41. It is therefore possible to prepare a number of different range determining frames so that various magnification factors can be selected by changing the range determining frame while using the same camera body 31. Conversely, it is possible to prepare two or more different camera bodies. The camera body 31 described above is adapted for APS film, and another camera body 31', as indicated by the imaginary line may be combined with the common range determining frame 32. FIG. 9 illustrates a camera body 31" which is adapted to receive a magazine for instant film. Thus, a desired one of different camera bodies can be attached to a common range determining frame. The camera body 31" is equipped with a shutter release button 11 in the case of the illustrated embodiment. But it is also possible to do away with such a shutter release button by providing a separate box 43 incorporated with a power switch 44 and a shutter release button 11 as indicated by the imaginary lines in FIG. 9.

In this case, the camera body 31 is not equipped with any shutter so that removing the range determining frame 32 without any provision could ruin the photographic film. If APS film is used, it can be wound back to the reel when replacing the range determining frame 32, and can be played back until the correct frame is placed in the focal plane once the new range determining frame 32 is fitted on the camera body 31 because such information can be stored in the APS film if desired. The instant film pack or cartridge is protected from exposure by a shield, and no such concern exists. Alternatively, the camera body 31 may be equipped with a retractable light shield or a shutter such as a focal plane shutter so that the film may not be exposed to light when changing the range determining frame or the camera body.

Figure 10:
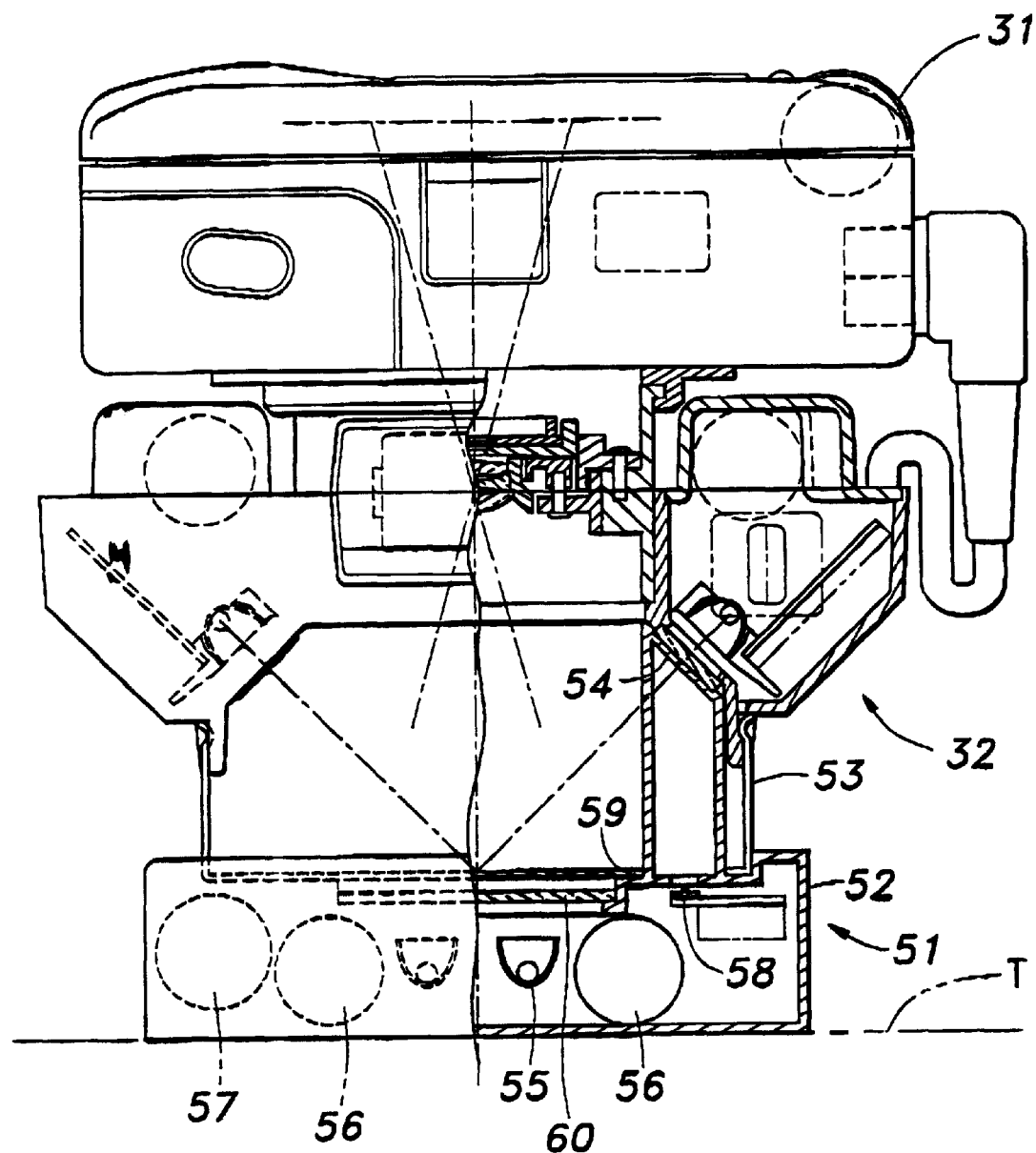
FIG. 10 is a partly broken away plan view of the arrangement illustrated in FIG. 7 with an adapter for illuminating the object with transmissive light.

FIG. 10 shows an adapter 51 for illuminating the object with transmissive light which can be interchangeably fitted on the front end of the range determining frame in place of a normal guide plate. This adapter 51 comprises a base end 53 which can be snap fitted on the front end of the range determining frame, and a casing 52 formed as a rectangular box. The casing 52 is provided with a projection which terminates as a shield plate 54 closely bearing upon the light emitting surface of one of the strobe bulbs 10. The side of the casing 52 facing the camera body is provided with a window which is closed by a light dispersing plate 60 and an object support glass plate 59. A pair of strobe bulbs 55 is placed inside the casing 52 so as to face the light dispersing plate 60. A pair of main capacitors 56 and a battery 57 for powering the strobe bulbs 55 are also placed inside the casing 52. A light sensor 58 is placed inside the casing 52 adjacent to the base of the projection for the shield plate 54 so as to be able to receive a part of the light from the strobe bulb 10 which is mostly shielded by the shield plate 54.

The operation of the apparatus when fitted with this adapter is described in the following. The photographic object which typically consists of an at least partly transparent object is placed on the object support glass plate 59 which may either freely rest on the glass plate or be secured in position by a clip or the like. The strobe selector switch 42 is typically selected for lighting only one of the strobe bulbs 10 on the side of the shield plate 54. When the shutter release button 11 is pressed, the corresponding strobe bulb 10 lights up, and this activates the strobe bulbs 55 placed inside the casing 52 of the adapter 51 by virtue of the light sensor 58. Thus, the object is lighted substantially strictly by the transmissive light from the strobe bulbs 55 placed inside the casing 52. If a combination of both transmissive light and reflectively light is desired, the strobe selector switch 42 is set for lighting both the strobe bulbs 10 so that the light from the unshielded strobe bulb 10 may directly impinge upon the photographic object as well as the transmissive light from the strobe bulbs 55 placed inside the casing 52.

Alternatively, the range determining frame 32 may be provided with a switch for disconnecting the strobe bulbs 10 in the range determining frame 32 and connecting the strobe bulbs 55 in the adapter casing 52 so that when the range determining frame 32 is fitted with the adapter, pressing of the shutter release button 11 causes the strobe bulbs 55 in the adapter casing 52 to be lighted up instead of the strobe bulbs 10 in the range determining frame 32.

Thus, according to the present invention, all the necessary conditions (distance to the object, lens position, aperture opening, shutter speed and lighting intensity) for close-up photography at a high magnification factor are incorporated in the apparatus so that a clear picture of a high magnification factor can be taken easily even for an inexperience person.

Although the present invention has been described in terms of preferred embodiments thereof, it is obvious to a person skilled in the art that various alterations and modifications are possible without departing from the scope of the present invention which is set forth in the appended claims.

What is claimed is:

1. A close-up photographing apparatus comprising:
   a range determining frame having a base end adapted to be attached to a camera body, a middle portion, and a free end;
   a frontal opening provided in said free end to define a photographic object area;
   a strobe light provided in said middle portion for lighting said photographic object area;
   a lens assembly including a lens and an aperture member incorporated in said base end, said aperture member defining a small aperture opening adapted for an intensity of light radiated from said strobe light onto said photographic object area;
   an adjusting member for axially moving said free end; and
   a synchronizing mechanism for moving said lens in synchronization with the movement of said free end so as to form a clear image on a film surface at a magnification factor selected from a range of magnification factors.

2. A close-up photographing apparatus according to claim 1, further comprising a camera body fixedly attached to said base end to form a photographic image on said film surface, said film surface being disposed in said camera body.

3. A close-up photographing apparatus according to claim 1, wherein said base end further comprises a mount for attaching and detaching said base end to a camera body.

4. A close-up photographing apparatus according to claim 3, wherein said camera body comprises a film winding mechanism for photographic roll film.

5. A close-up photographing apparatus according to claim 3, wherein said camera body is adapted for a film cartridge for instant photographic film.

6. A close-up photographing apparatus according to claim 1, wherein said free end further comprises a flat plate member having said frontal opening defined therein.

7. A close-up photographing apparatus according to claim 1, wherein said free end further comprises a side cut-out, said side cut-out allowing said photographic object area to be viewed from the side when said free end is placed flat on a photographic object.

8. A close-up photographing apparatus according to claim 1, wherein said middle portion defines an inner chamber accommodating components for powering said strobe light.

9. A close-up photographing apparatus according to claim 1, further comprising an adapter for illuminating a photographic object in said photographic object area by transmitting light through said photographic object toward said lens.

10. A close-up photographing apparatus, comprising:
 a range determining frame comprising a free end, a middle portion, and a base end, said base end being attachable to a camera body;
 a frontal opening provided in said free end, said frontal opening defining a photographic object area,
 a side cut-out provided in said free end, said side cut-out allowing said photographic object area to be viewed from the side when said free end is placed flat on a photographic object;
 a strobe light provided in said middle portion for illuminating said photographic object area; and
 a lens assembly, said lens assembly comprising a lens and an aperture member incorporated in said base end, said aperture member defining a small aperture opening adapted for an intensity of light radiated from said strobe light onto said photographic object area.

11. A close-up photographing apparatus according to claim 10, further comprising a camera body fixedly attached to said base end to form a photographic image on a surface of a photographic film disposed in said camera body.

12. A close-up photographing apparatus according to claim 10, wherein said base end further comprises a mount for attaching and detaching said base end to a camera body.

13. A close-up photographing apparatus according to claim 12, wherein said camera body comprises a film winding mechanism for photographic roll film.

14. A close-up photographing apparatus according to claim 12, wherein said camera body is adapted for a film cartridge for instant photographic film.

15. A close-up photographing apparatus according to claim 10, wherein said free end further comprises a flat plate member having said frontal opening defined therein.

16. A close-up photographing apparatus according to claim 10, wherein said middle portion defines an inner chamber accommodating components for powering said strobe light.

17. A close-up photographing apparatus according to claim 10, further comprising:
 an adjusting member for axially moving said free end; and
 a synchronizing mechanism for moving said lens in synchronization with the movement of said free end so as to form a clear image on a film surface at a magnification factor selected from a range of magnification factors.

18. A close-up photographing apparatus according to claim 10, further comprising an adapter for illuminating said photographic object by transmitting light through said photographic object toward said lens.

19. A close-up photographing apparatus, comprising:
 a range determining frame comprising a base end and a free end, said base end being attachable to a camera body;
 a lens assembly, said lens assembly comprising a lens and an aperture member incorporated in said base end, said aperture member defining a small aperture opening adapted for an intensity of light radiated from a strobe light onto a photographic object area;
 a frontal opening provided in said free end, said frontal opening defining said photographic object area; and
 an adapter, said adapter being attachable to said free end, said adapter illuminating a photographic object provided in said photographic object area by transmitting light through said photographic object toward said lens.

20. A close-up photographing apparatus according to claim 19, further comprising a middle portion, said middle portion comprising a strobe light for illuminating said photographic object area, said middle portion being coupled between said base end and said free end.

21. A close-up photographing apparatus according to claim 19, further comprising a camera body fixedly attached to said base end to form a photographic image on a surface of a photographic film disposed in said camera body.

22. A close-up photographing apparatus according to claim 19, wherein said base end further comprises a mount for attaching and detaching said base end to a camera body.

23. A close-up photographing apparatus according to claim 22, wherein said camera body comprises a film winding mechanism for photographic roll film.

24. A close-up photographing apparatus according to claim 22, wherein said camera body is adapted for a film cartridge for instant photographic film.

25. A close-up photographing apparatus according to claim 19, wherein said free end further comprises a flat plate member having said frontal opening defined therein.

26. A close-up photographing apparatus according to claim 19, wherein said free end further comprises a side cut-out, said side cut-out allowing said photographic object area to be viewed from the side.

27. A close-up photographing apparatus according to claim 19, wherein said middle portion defines an inner chamber accommodating components for powering said strobe light.

28. A close-up photographing apparatus according to claim 19, further comprising:
 an adjusting member for axially moving said free end; and
 a synchronizing mechanism for moving said lens in synchronization with the movement of said free end so as to form a clear image on a film surface at a magnification factor selected from a range of magnification factors.

* * * * *